US007013907B2

(12) United States Patent
Ryabtsev et al.

(10) Patent No.: US 7,013,907 B2
(45) Date of Patent: Mar. 21, 2006

(54) GAS PURGE VALVE

(75) Inventors: Vladimir Ryabtsev, Herzilya (IL); Youval Katzman, Zichron Yaacov (IL); Mordechai Kandanyan, D.N. Ramat Hagolan (IL)

(73) Assignee: A.R.I. Flow Control Accessories Agricultural Cooperative Association Ltd., D.N. Ramat Hagolan (IL)

( * ) Notice: Subject to any disclaimer, the term of this patent is extended or adjusted under 35 U.S.C. 154(b) by 343 days.

(21) Appl. No.: 10/609,127

(22) Filed: Jun. 30, 2003

(65) Prior Publication Data

US 2004/0050427 A1    Mar. 18, 2004

(30) Foreign Application Priority Data

Jul. 2, 2002    (IL) ..................................... 150520

(51) Int. Cl.
   *F16K 15/02*    (2006.01)

(52) U.S. Cl. .................... 137/198; 137/202; 137/68.11

(58) Field of Classification Search ............. 137/68.11, 137/198, 202
See application file for complete search history.

(56) References Cited

U.S. PATENT DOCUMENTS

| 4,082,106 A | 4/1978 | Butcher |
| 4,770,201 A | 9/1988 | Zakai |
| 6,145,533 A | 11/2000 | Perkins |
| 6,186,160 B1 | 2/2001 | Hennrich et al. |

*Primary Examiner*—Kevin Lee
(74) *Attorney, Agent, or Firm*—Nath & Associates PLLC; Gregory B. Kang; Derek Richmond

(57) ABSTRACT

A gas purge valve comprising a housing fitted with an inlet port being in flow communication with a liquid outlet port, and at least one gas outlet member, a gas flow barrier associated with the liquid outlet port, a float member displaceable within the housing between a first position adjacent the inlet port and a second position adjacent the gas outlet The at least one gas outlet is fitted with an inlet prohibiting valve, and is sealingly engageable by a flexible sealing member articulated to the float member. Buoyant displacement of the float member into the second position entails sealing of the at least one gas outlet by the flexible sealing member.

51 Claims, 15 Drawing Sheets

GAS PURGE VALVE

FIELD OF THE INVENTION

The present invention generally relates to gas purge valves and more particularly it is concerned with air release valves suitable for discharging gas at a wide range of pressure and flow rate, including substantially low gas pressure and low flow rate.

BACKGROUND OF THE INVENTION

Air purge valves are generally fitted to liquid conduits such as, for example, mains distribution lines or sewage distribution conduits and are designed to ensure the release of air or other gases from the conduits, thereby avoiding the production of air locks, for example, which would interfere with the flow of the liquid. Air flowing through a liquid supply line may, apart from causing mechanical damage to equipment fitted on the conduit, also cause malfunctioning of different devices such as flow meters, valves and the like.

Two different kinds of gas puree valves are known. In both kinds, a float is located in a housing which is coupled at a lower end thereof to the conduit to be vented and which is provided at its upper end with a venting outlet aperture. In the course of normal operation with the flow of liquid through the conduit, the housing falls with liquid and the spherical float is forced upwardly against the outlet aperture sealing the same. However, when air accumulates in the conduit, the float is displaced downwardly under its own weight thereby opening the outlet aperture with consequent venting of the air. Then, the housing again fills with liquid and the aperture is sealed by the float.

In a first kind of air purge valve, known as the automatic kind, the outlet aperture is of relatively small dimensions and the float is displaced downwardly responsive to air presence in the housing, thereby allowing for the continuous, automatic venting of the conduit. However, in view of the relatively small dimensions of the aperture, this automatic kind cannot cope with situations wherein large quantities of air have to be vented and when such a situation arises, not all the air is released and some of it passes into the line, potentially giving rise to an air lock.

The second kind of air purge valve is used in order to cope with the situation wherein sudden large quantities of air appear in the line (e.g. upon filling, an empty conduit system) and have to be discharged (released from the conduit, for example to the atmosphere). This type of valve is the so-called kinetic valve. This valve has a relatively large aperture through which large quantities of air can be rapidly and effectively vented. However, with such a kinetic valve, once the housing thereof has filled with liquid and the float has been pressed against the large aperture so as to seal it, the valve will only reopen once the pressure in the housing has dropped to atmospheric pressure and, in consequence, the kinetic valve cannot be used for the continuous release of small amounts of air, in particular when flowing at high pressure.

Gas purge valves combining the features of the automatic and the kinetic types have been designed, which effectively consist of a kinetic valve and, superimposed thereon, an automatic valve. With such combination-type valves, continuous release of relatively small amounts of air throughout operation take place through the automatic valve, whilst sudden bursts of large quantities of air are released through the kinetic valve. Such combined valves are nevertheless of relatively bulky and expensive construction.

U.S. Pat. No. 4,770,201 to Zakai, discloses a combined type of gas purge valve comprising a housing having a fluid through-flow aperture with a valve seating formed in the housing and bounding said aperture. A flexible closure membrane is secured at one end to the housing and is adapted to be biased, under fluid pressure in the housing, against the valve seating so as to seal the aperture. Membrane displacing means are secured to an opposite end of the membrane so that displacement of the displacing means in a first sense progressively detaches successive transverse portions of the membrane from the seating so as to open the aperture while displacement of the displacing means in an opposite sense allows for the membrane to become sealingly biased against the seating.

U.S. Pat. No. 4,082,106 to Butcher discloses a valve for automatically collecting and venting gases included in flowing liquid. The valve has a chamber in which air collects, a float in the chamber and a vent valve at the top operated by the float to vent the chamber when the liquid level falls. The vent valve has a convex or concave seat with apertures therein and is sealed by a flexible diaphragm which is peeled progressively from the seat to open the valve. The diaphragm may be annular and fixed at its outer periphery, being flexed by a coupling at its center, or may be fixed at the center and flexed by a coupling at its periphery.

It is an object of the present invention to provide a new and improved gas purge valve having a compact and inexpensive structure. In particular, the gas purge valve according to the present invention is suitable for discharging of significantly low amounts of gas, i.e. gas flowing through a conduit at significantly low pressure and at a low flow rate. However, the device will also discharge of gas flowing at high flow rate and at higher pressure. Still a further object of the present invention is to provide a gas purge valve of the specified type, suitable for mounting to liquid conduits with varied configurations such as a through-flow device or an appendix type.

SUMMARY OF THE INVENTION

The present invention calls for a gas purge valve which is particularly but not exclusively adapted for fitting on a liquid supply conduit, upstream of a liquid flow device, e.g. a flow meter (water meter). According to one application, the gas purge valve according to the invention is fitted for mounting as a through-flow device, i.e. on a vertical conduit segment, where liquid flows through the valve housing. According to an alternative application the gas purge valve is fitted on a non-vertical conduit segment, e.g. a generally horizontal conduit, where liquid does not flow through the valve housing.

According to the present invention there is provided a gas purge valve comprising, a housing fitted with an inlet port being in flow communication with a liquid outlet port and at least one gas outlet; a gas flow barrier associated with the liquid outlet port; a float member displaceable within the housing between a first position adjacent the inlet port and a second position adjacent the gas outlet; said at least one gas outlet fitted with an inlet prohibiting valve, and being sealingly so engageable by a flexible sealing member articulated to the float member, whereby buoyant displacement of the float member into the second position entails sealing of the at least one gas outlet by the flexible sealing member.

According to a particular embodiment of the present invention, the gas flow barrier is a normally closed one-way valve, which responsive to a pressure exceeding a predetermined magnitude admits liquid flow in direction from the inlet port towards the outlet.

According to a first application of the invention, the valve is fitted on a non-vertical conduit segment (appendix-type mounting), wherein a liquid flow path extends between the inlet port and the outlet port, and where the housing is formed with an inlet duct extending intermediate the inlet port and a float receiving space of the housing.

According to a second application of the invention, referred to as a so-called through-flow gas purge valve, the liquid flow path extends through the housing. Accordingly, the outlet port and the housing coaxially extend-along a vertical axis of the housing. In accordance with a particular embodiment of this application, the outlet port accommodates the gas flow barrier.

Occasionally, the valve may malfunction, e.g. as a result of sand, dirt, etc. entering the valve. By a further aspect of the invention, the valve is thus provided with a user-interruptible inactivating arrangement.

According to one inactivating arrangement of the present invention, the housing is formed with an inlet duct extending intermediate the inlet port and a float receiving space of the housing, where flow through said inlet duct is user-interruptible to thereby inactivate the valve. In a valve of the first application, inactivating the valve does not interrupt fluid flow between the inlet port and the outlet port. In a valve of the second application, inactivating the valve permanently stops liquid flow between the inlet port and the outlet port. According to one embodiment, interruption is obtained by forcefully introducing a tool through a breakable wall of the inlet duct, said tool serving also for blocking flow through the inset duct.

According to a different inactivating arrangement the gas outlets open into an outlet chamber formed under a top cap formed with one or more discharge openings. The chamber is fitted with one or more sealing members corresponding with the discharge openings of the top cap, where inactivating the valve is achieved by aligning the one or more discharge openings with the one or more sealing members so as to seal the discharge openings.

According to this arrangement, either the top cap is rotatable over the housing or the sealing members may be fitted over an accessible rotary member.

An advantage of this arrangement is that the valve may be inactivated and easily reactivated on demand.

The housing comprises at least one and preferably at least a pair of gas outlet ports, each bounded by a sealing seat sealingly engageable by a corresponding sealing portion of the sealing member. Furthermore, at least one of the gas outlet ports comprises a first outlet aperture and a second outlet aperture bounded by first and second valve seatings, respectively; and where displacement of the float member from the second to the first position, progressively detaches the sealing member initially from the first valve seating so as to open initially said first outlet aperture and subsequently from said second valve seating so as to open subsequently said second outlet aperture, whilst buoyant displacement of said float member from said first position to said second position allows for said float member to become sealingly biased against said seatings.

According to the second application of the invention, a liquid flow path extends through the housing essentially vertically between the inlet port and the outlet port.

It is desirable for a valve according to either of the applications of the present invention., to be tamper-proof, so that it is not possible to override it and "steal" water. Accordingly, a cap is fitted over the valve housing, to thereby prohibit tampering with the valve through the gas outlets.

According to an embodiment of the first application of the invention., the inlet port and the liquid outlet port are integrally formed with the housing, where a liquid flow path extends between the inlet port and the outlet port. According to one particular embodiment, the housing is made of plastic material and the flow path extends through a uniform metallic coupling member.

Preferably, a first portion of the sealing member, adapted to bear against the first valve seating, is of lesser rigidity than a second portion, adapted to bear against the second valve seating. To increase sealing engagement of the sealing member with the respective seatings of the gas outlets, the second portion of the sealing member comprises a cushioned sealing portion engageable by a corresponding biasing portion of the float member biasing it into sealing engagement with the outlet valve seatings.

The cushioned sealing portion of the sealing member and the biasing portion of the float member are equally inclined with respect to an axis of displacement of the float member. According to one particular design, the cushioned sealing portion of the sealing member is formed with a bulge engageable by the corresponding biasing portion of the float member, to thereby give rise to reactionary forces acting along a line normal to a sealing surface of the first portion of the sealing member.

To increase the sealing force acting on the sealing member when it is engaged with the seatings of the gas outlets, one of the first portion of the sealing member and the corresponding second valve seating is indented with respect to the other one of said first portion of the sealing member and the corresponding second valve seating, to thereby increase the effective sealing area.

According to a particular embodiment of the invention, the valve is an inexpensive, disposable device, fitted on a water supply line, adjacent before a water flow meter.

BRIEF DESCRIPTION OF THE DRAWINGS

In order to understand the invention and to see how it may be carried out in practice, several embodiments will now be described, by way of non-limiting examples only, with reference to the accompanying drawings, in which.

DETAILED DESCRIPTION OF SPECIFIC EMBODIMENTS

Figure 1A:
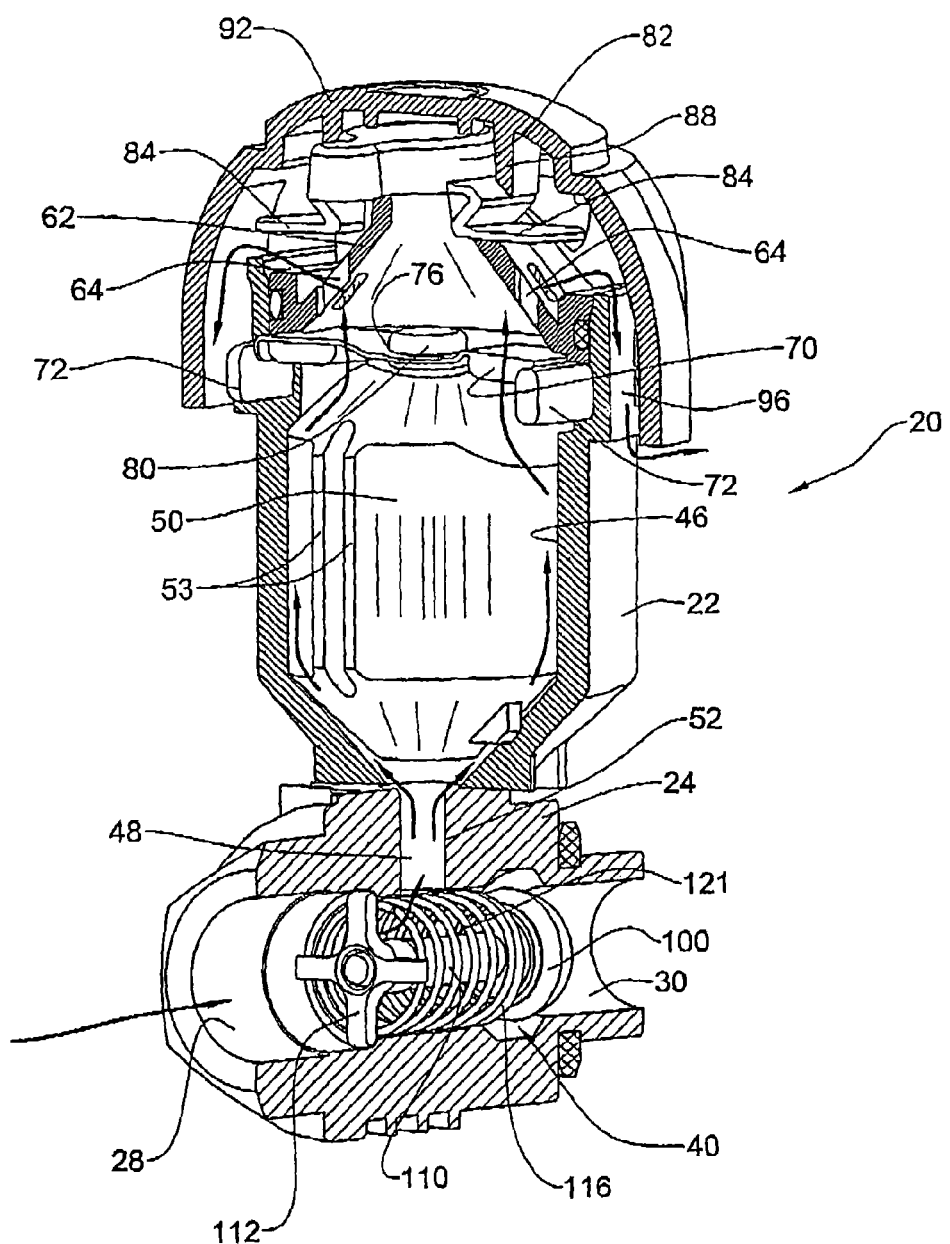
FIG. 1A is an axially sectioned isometric view of a valve in accordance with a first embodiment of the invention, the valve in its air-releasing position.
Figure 1B:
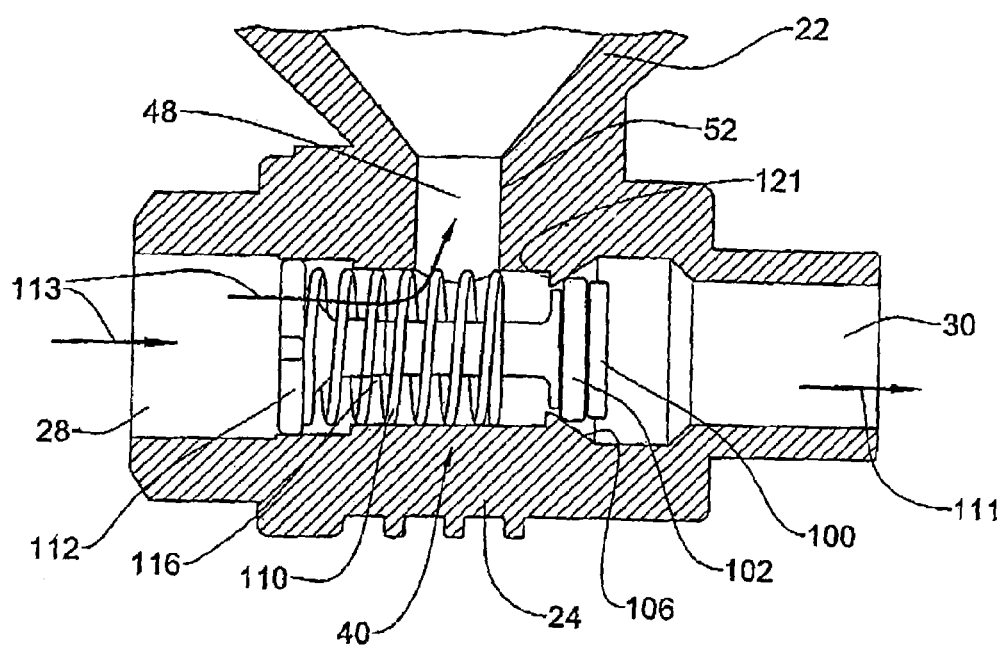
FIG. 1B is a sectional elevation of a gas-flow barrier valve in accordance with an embodiment of the present invention, in its normally-closed position, as in FIG. 1A.
Figure 2A:
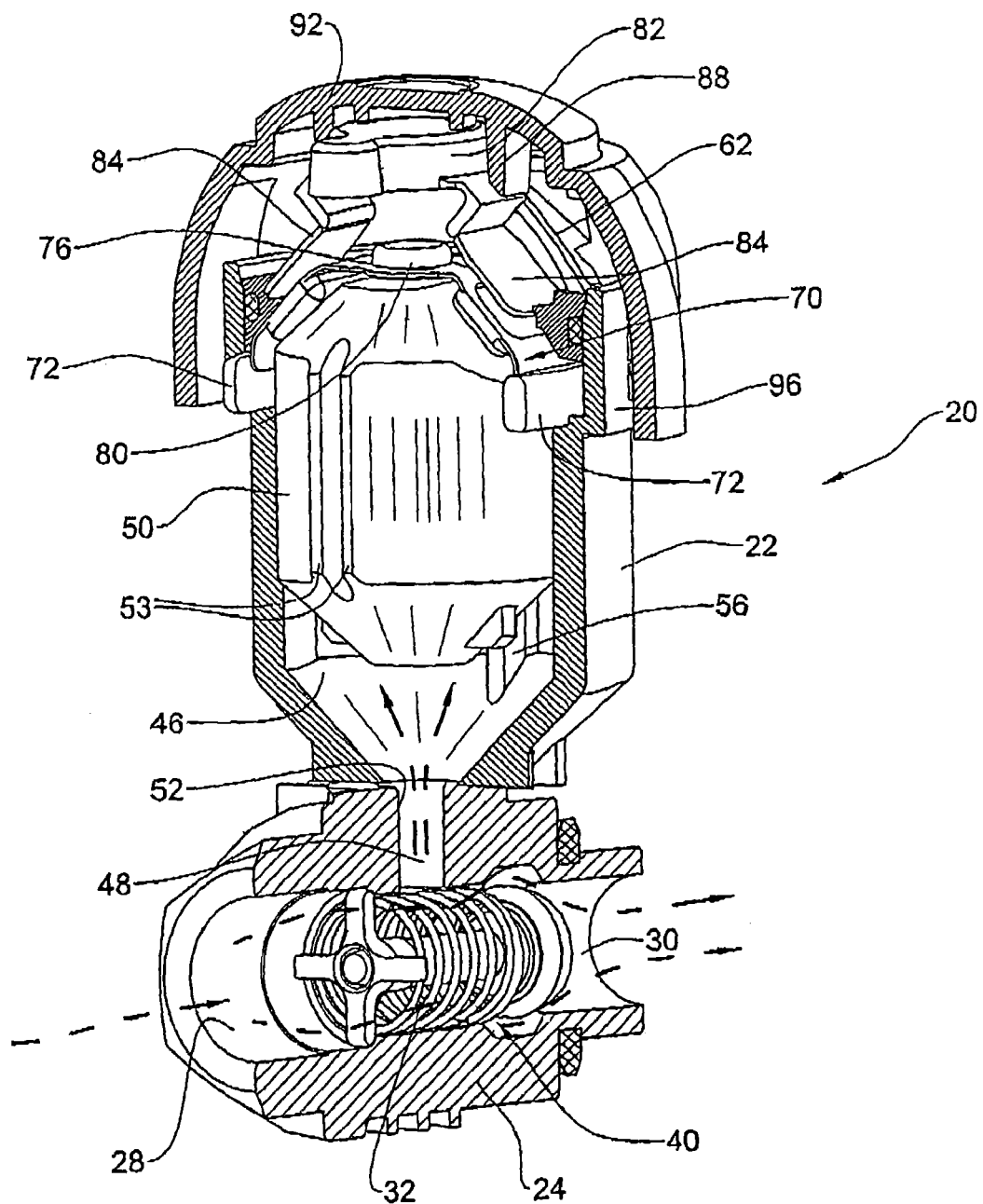
FIG. 2A is an axially sectioned isometric view of a valve in accordance with a first embodiment of the invention, the valve in its closed position.

Attention is first directed to FIGS. 1 and 2 illustrating a first embodiment of a gas purge valve in accordance with the present invention generally designated 20, illustrated in. FIG. 1A in a so-called open position, namely an air releasing position and in FIG. 2A illustrated in a so-called closed position, as will become apparent hereinafter.

The embodiment of FIGS. 1 and 2 illustrates a structure suitable for mounting on a non-vertical conduit segment, e.g. a generally horizontal conduit. The valve 20 comprises a housing 22 which is a cylindrical structure extending essentially vertical from a liquid coupling member 24, formed with an inlet port 28 and an outlet port 30 with a flow path 32 (FIG. 2A) extending therebetween. In the present example, housing 22 is integrally formed with the liquid coupling member 24, manufactured of molded plastic material, with suitable reinforcement structural ribs. It is however appreciated that this is a mere example and the housing 22 and liquid coupling member 24 may be separate units coupled together. The valve of the specified type is typically suitable for mounting in front of a water flow meter (not shown), but not necessarily restricted to this positioning.

Received within the liquid coupling member 24, intermediate the inlet port 28 and the outlet port 30 there is fitted a gas flow barrier generally designated 40 in the form of a normally closed one-way spring biased valve, as will be explained hereinafter in more detail with reference to FIGS. 1B and 2B.

Housing 22 is formed with an essentially vertical float receiving space 46 being in flow communication with the flow path 32 via inlet duct 48 extending through a neck portion 52. Axially displaceable within lie float receiving space 46 there is disposed a generally cylindrical float member 50 comprising two or more axial grooves 53 slidably engageable with corresponding axial ribs 56 (seen clearly in FIG. 8C) so as to ensure that the float member 50 performs only axial displacement and does not rotate within housing 22. A gas outlet member 62 (best seen in FIGS. 3A and 3B) is fixedly fitted at an upper end of the housing 22 in a sealed snap-type connection. The gas outlet member 62 is formed with a plurality of gas outlets 64 and 66 as will be explained hereinafter in more detail with references to FIGS. 3A and 3B. The gas outlets 64 and 66 are sealingly engageable by a flexible sealing member generally designated 70 which is seen in more detail in FIGS. 4A and 4B.

Sealing member 70 is in the form of a strip of material comprising at its two remote ends a bulging portion 72 securely arrested within a suitable receptacle of the housing 22 and clamped by the gas outlet member 62, as illustrated in FIGS. 1A and 2A. An aperture 76 is formed at a center portion of the sealing member 72 for engagement over a coupling bulge 80 of the float member 50 whereby axial displacement of the float member 50 entails displacement of the sealing member 70 between an open position as in FIG. 1A and a closed, sealing position, wherein the gas outlets 64 and 66 are sealed by the scaling member, as in FIG. 2B and as will be explained hereinafter in more detail.

An inlet prohibiting valve member 82, comprises two leaf-type sealing members 84 (FIGS. 1A, 2A) adapted for sealing engagement over the gas outlets 64 and 66 thereby prohibiting ingress into the housing of gas, liquid, dirt, etc. In FIG. 1A, the inlet prohibiting valve member 82 is in its open position, i.e. allowing gas to escape through gas outlets 64 and 66 whilst in FIG. 2A, the inlet prohibiting valve member 82 is in the so-called closed position, thus prohibiting ingress into the float receiving space 46. It is appreciated that the leaf-type sealing members 84 are normally in their closed position as in FIG. 2A and are easily displaceable into the open position as in FIG. 1A, by the mere flow of gas through the outlets 64 and 66. This effect is increased by imparting the leaf-type closures 84 with a pre-stressed deformation by projections 88 formed in a top cover 92 of the valve pressing against respective portions of the inlet prohibiting valve member 82.

Top cover 92 is snapily mounted over the housing 22 leaving an interstice 96 therebetween constituting a gas outlet flow which is tamper-proof, i.e. does not allow access to manipulate the float member and to override the valve so as to allow liquid flow through the interstice 96 (merely for the purpose of stealing water).

Figure 2B:
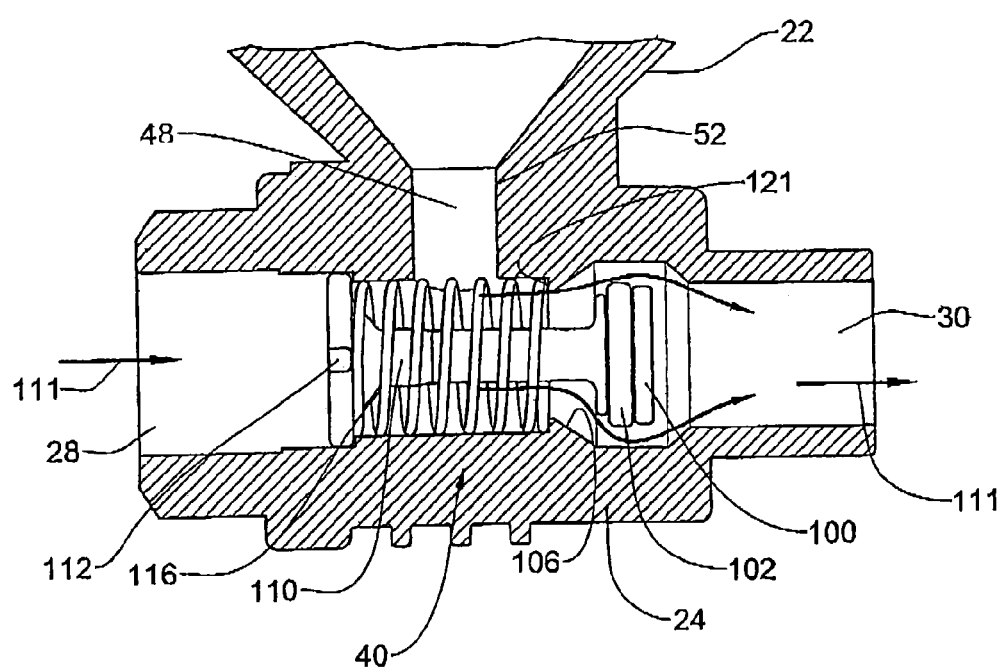
FIG. 2B is a sectional elevation of the gas-flow barrier valve seen in FIG. 2A.

Turning now also to FIGS. 1B and 2B, detailed reference will be made to the gas flow barrier 40 which is coaxially fitted within the liquid coupling member 24 between the inlet port 28 and the outlet port 30. As already mentioned hereinbefore, the gas flow barrier 40 is in the form of a normally closed one-way valve, comprising a sealing member 100 fitted with a sealing ring 102 and being coaxially displaceable within the liquid coupling member between a closed position (FIG. 1B) in which the sealing ring 102 sealingly bears against a sealing seat 106, and an open position (FIG. 2B) in which liquid flow between the inlet port 28 and the outlet port 30 is admitted. Sealing member 100 is fitted with a stem 110 fitted at an inlet end thereof with a guiding member 112 slidingly displaceable within the inlet port 28. A biasing spring member 116 bears at one end against said guiding member 112 and at an opposed end thereof against an annular rib 121 of the liquid coupling member 24, thereby biasing the sealing member 100 into the normally closed position as in FIG. 1B.

The arrangement is such that liquid entering the liquid coupling member 24 through inlet port 28 applies sufficient force on the sealing member 100 so as to displace it into the open position (FIG. 2B) to facilitate liquid flow through the flow path 32, i.e. in the direction between the inlet port 28 and the outlet port 30 along a flow path represented by arrows 111. However, gas flowing through the inlet port will not displace the gas-flow barrier 40 into the open position and wig thus continue flow through the duct 48 and into the float receiving space 46 within housing 22 along a flow path represented by arrows 113 (FIG. 1B). It is appreciated that in this position the gas outlets 64 and 66 and the inlet prohibiting valve member 82 open even under mild flow pressure of the flowing gas.

As long as only gas flows through the float receiving space 46, the float member 50 remains in its bottom position, as in FIG. 1A, retaining the sealing member 100 in the open position whereby gas can easily escape through gas outlet outlets 64 and 66 and then to the atmosphere through interstice 96 extending between the housing 22 and the top cap 92.

The flow path of gas through the valve in its so-called open position is represented in FIG. 1A by solid arrows.

In the event of liquid flowing through the inlet port 28, the gas flow barrier 40 displaces into the open position (FIGS. 2A and 2B), allowing liquid flow to pass through the flow path 32 between the inlet port 28 and the outlet port 30, as illustrated by dashed arrows (FIG. 2A). Some of the liquid, however, enters the float receiving space 46 applying buoyancy forces on the float member 50, resulting in its immediate displacement into its uppermost position as in. FIG. 2A, resulting in turn in sealing displacement of the flexible sealing member 70 against the gas outlets 64 and 66, sealing the valve and preventing liquid egress through the gas outlets 64 and 66. It is noted that in this position the inlet prohibiting valve member 82 is in its normally closed position with flaps 84 sealingly bearing against the openings of the gas outlets 64 and 66.

Presuming that some gas is entrapped within the piping it will eventually accumulate within the float receiving space 46, eventually causing the float member 50 to descend, entailing initially pealing of the valve member from the gas outlets to allow escape of small amounts of gas (as will be explained in more detail hereinafter), or completely descending to the downward position of the float member 50 (FIG. 1A) where significant amounts of gas can escape through the gas outlets 64 and 66 until the float member 50 is again displaced into its uppermost position under buoyancy forces applied thereto by liquid entering the float receiving space 46.

Figure 4A:
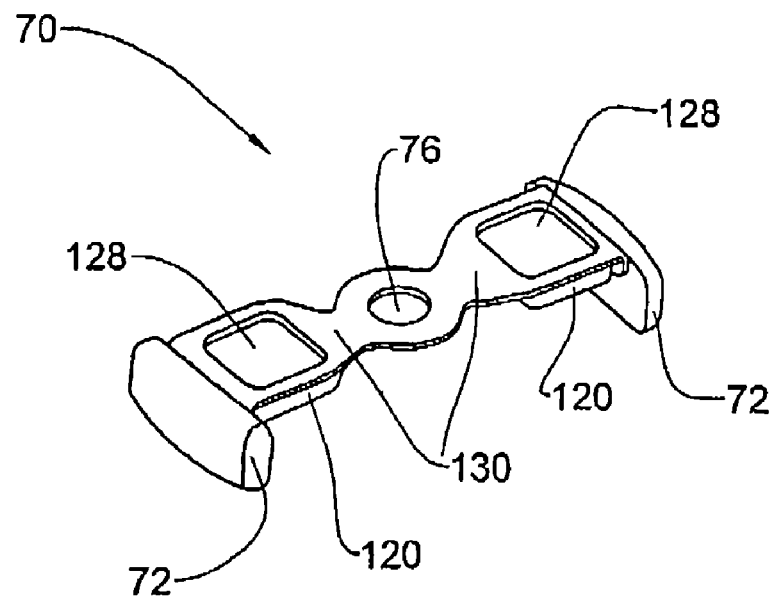
FIGS. 4A and 4B are top and bottom perspective views, respectively, of the flexible sealing member used with a valve in accordance with the present invention.
Figure 4B:
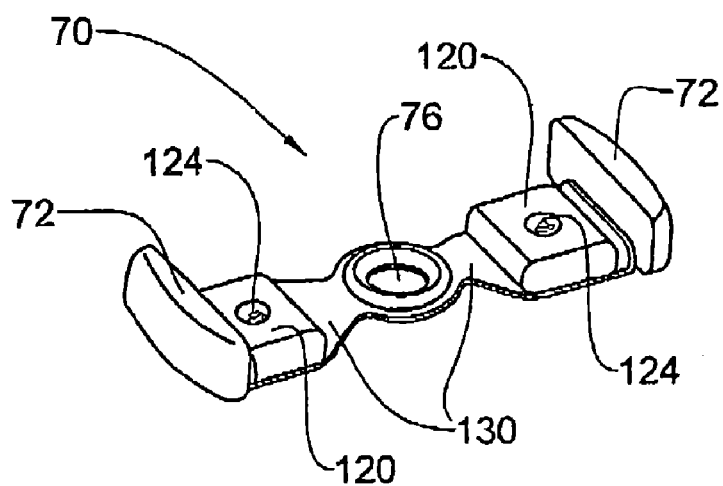

Turning now to some particular matters, further attention is now directed to FIGS. 4A and 4B illustrating the sealing member generally designated 70. Sealing member 70 comprises two cushioned sealing portions 120, each formed at a bottom face thereof with a projecting bulge 124 and at a top face thereof with a rectangular indention 128. The cushioned sealing portions 120 are relatively rigid, i.e., non-flexible. Contrary thereto, intermediate the sealing portions 120 there are two resilient sealing zones 130 imparting the sealing member 70 flexibility.

Figure 3A:
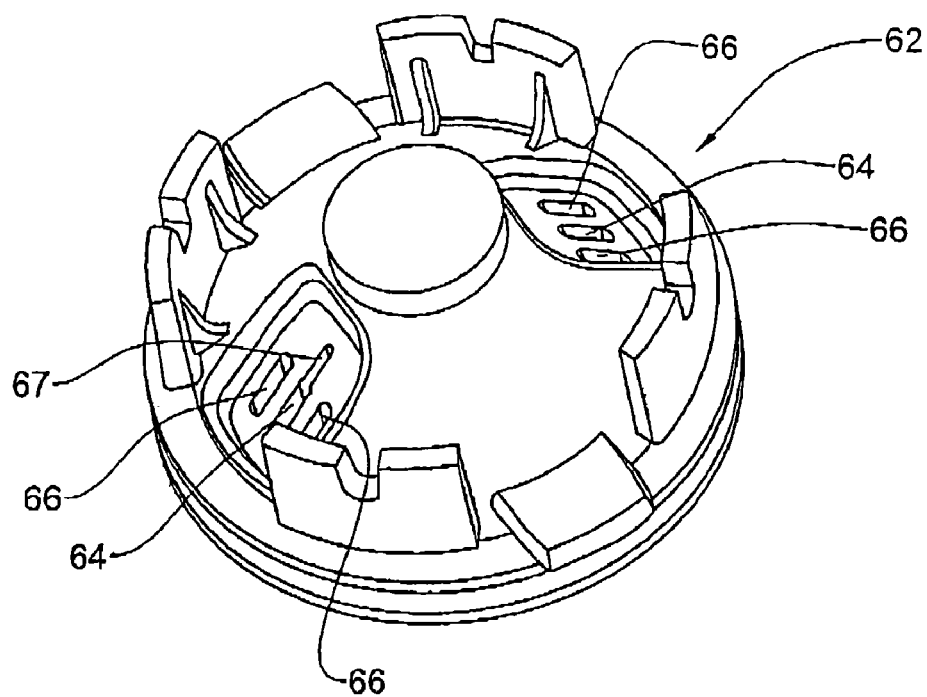
FIG. 3A is a top perspective view of a valve seating member in accordance with the present invention.
Figure 3B:
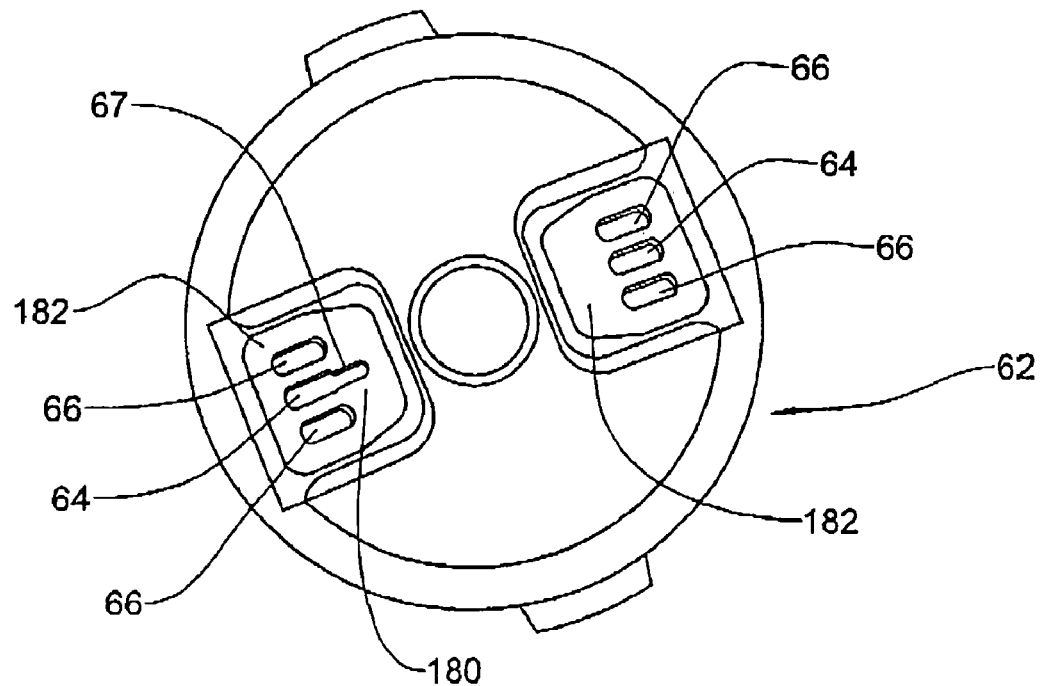
FIG. 3B is a bottom perspective view of the valve seating illustrated in FIG. 3A.

Turning to FIG. 3I, which is a bottom view of the gas outlet member 62, it is noticed that the gas outlet 64 (referred to in the claims as a first outlet aperture) differs from the gas outlets 66 (referred to in the claims as a second outlet aperture) in that it comprises an extension or extended slit portion 67 bounded by a first valve seating 180 where the outlets 66 are bounded by a second valve seating 182, said first and said seatings being in the form of an essentially flat surface. The extended slit portion 67 of the first gas outlet 64 is noticeable also in FIGS. 3A, 5 and 6. It is appreciated that an extended slit portion may be formed at one or both sides of the gas outlet member 62 and that more then one gas outlet may be formed with an extended slit portion.

Figure 5:
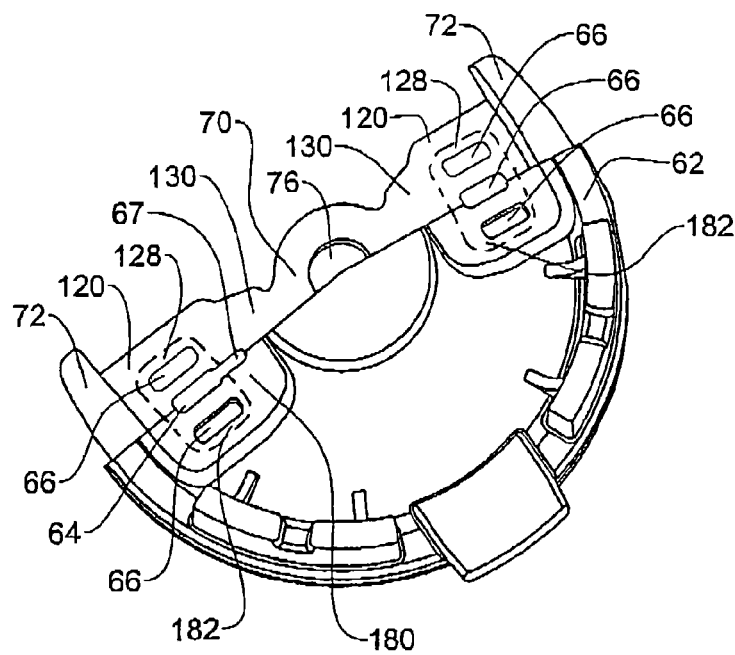
FIG. 5 is a top view superimposing a partial view of the gas outlet member and of the sealing member.
Figure 6:
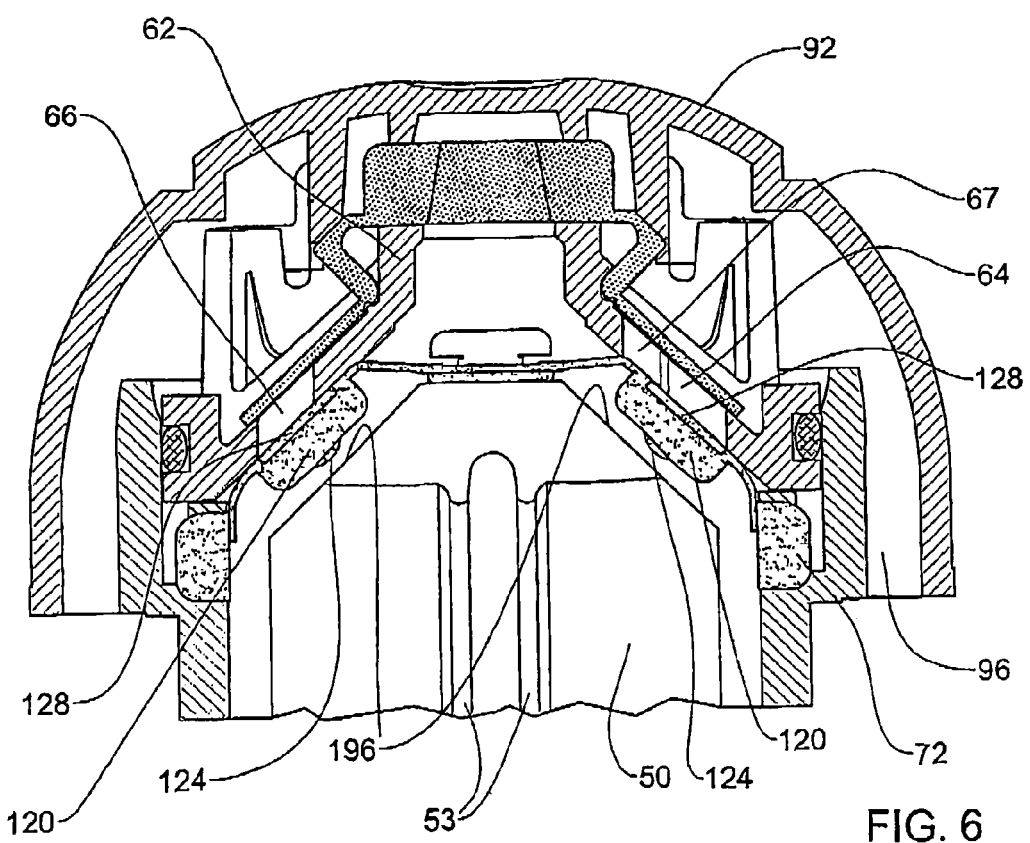
FIG. 6 is an enlarged sectional view of a top portion of the valve in its closed position.

With further reference to FIGS. 5 and 6, it is noticeable that the extended slit portion 67 (extending from of gas outlet 66) is engageable by the corresponding resilient portion 130 of the sealing member 70 whilst the larger gas outlets 64 are sealingly engageable by the rigid sealing portion 120 of the sealing member 70. It is further noticed in FIG. 5 that the second valve seatings 182, represented in FIG. 5 by a dashed line, is engageable by the rigid sealing portion 120 of the sealing member 70 and in particular it is noted that the indented portion 128 corresponds with the second valve seatings 182 though it does not cover the first outlet aperture's extended slit portion 67 of outlet 66.

The above arrangement has several advantages. First, the resilient sealing portion 130 of the sealing member 70 is peelable from the extended slit portion 67, thus constituting a so-called automatic gas purge valve where insignificant amounts of gas, i.e. bubbles, may be easily discharged from the valve housing on the one hand, and on the other hand, the progressive detachment of the sealing member, initially from the first valve seating 180 first to initially open the extended slit portion 67 renders it easier to subsequentially detach the rigid sealing portion 120 from the second valve seating 182. This renders a valve in accordance with the present invention the qualities of a so-called combined gas discharge valve, namely a kinetic valve suitable for discharging large amounts of gas and an automatic valve for discharging small amounts of gas also when flowing at low pressure and at low flow rate.

A second advantage of the above structure is that the effective sealing area between the rigid sealing portion 120 and the second valve seating 182 (bordering the gas outlet 64) is significantly increased. In practice, effective sealing area is the sectional area of the indented portion 128 of the sealing member 70. In the absence of the indented portion, the effective sealing area would be the sectional area of the gas outlets 64 and 66 which is significantly less than, that of the indented portion 128. However, it is appreciated that rather than forming the indented portion 128 in the sealing member 70, the indentation may be formed around the valve seatings formed at the gas outlet member 62.

With finder reference to FIG. 6, it is noticeable that sealing of the gas outlets 64 and 66 is obtained upon displacement of the float member 50 into its upper position whereby the sealing member 70 is pulled into its sealing position. However, in order to ensure tight sealing of the gas outlets 64 and 66, the float member 50 is formed at an upper end thereof with two tapering surfaces 196 inclined in correspondence with the geometry of the valve seatings 182 of the gas outlet member 62. The arrangement is such that upon descending of the float member 50, the inclined surfaces 196 encounter the bulges 124 of sealing portions 120 of sealing member 70, thereby tightening the sealing effect of the sealing portions 120 against the second valve seatings 182. This arrangement ensures that the rigid sealing portions 120 are displaced into sealing engagement with the second valve seatings 182 at parallel relation albeit encountering surfaces 196 of float member 50 not at right angles.

Figure 7A:
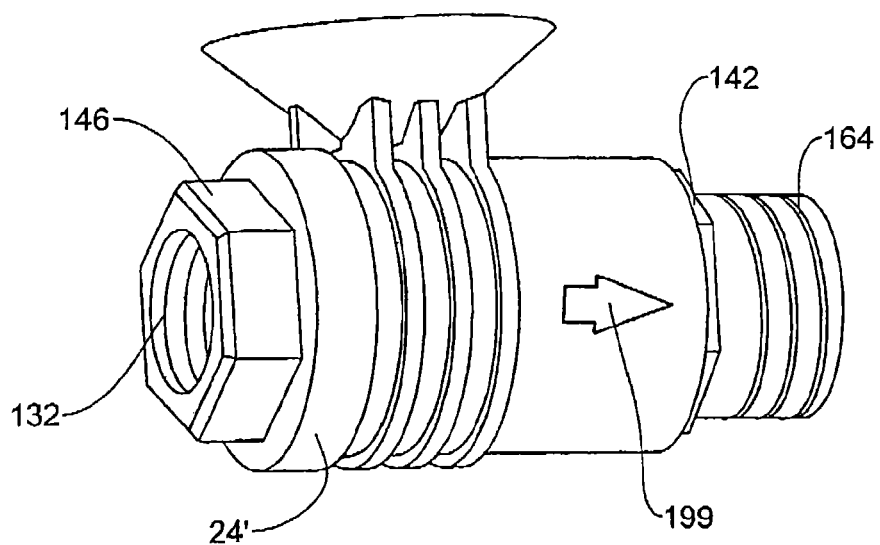
FIG. 7A is an isometric view of a liquid coupling member in accordance with an alternative embodiment of the invention., fitted with a metal coupling insert.
Figure 7B:
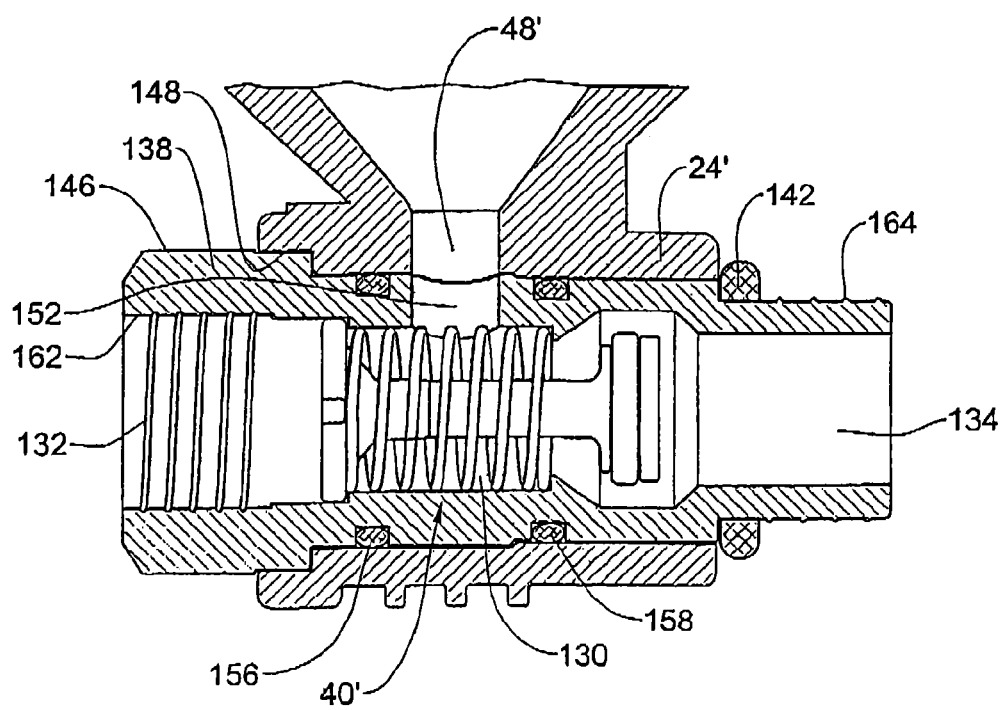
FIG. 7B is a section through the embodiment of FIG. 7A.

In FIGS. 1 and 2, the liquid coupling member 24 is made integrally with the housing 22, molded of plastic material. FIGS. 7A and 7B illustrate an alternative design wherein a liquid flow path 130 extends between an inlet 132 and an outlet 134 of a metallic insert tube segment 138 securely fixed within the liquid coupling member 24' by a fastening nut 142. In this embodiment, the liquid coupling member 24' is integrally molded with the housing (not shown). The tube segment 138 has a hexagonal portion 146 snugly received within a corresponding hexagonal inlet opening 148 of the liquid coupling member 24' to thereby ensure that a liquid duct 152 of the metal tube segment 138 coincides with the inlet duct 48' of the liquid coupling member 24' (FIG. 7B). However, other arrangements are possible as well for ensuring correct assembly of the metallic tube segment within the coupling member. A gas flow barrier 40' is received within the flow path 130, similar to the arrangement disclosed in the previous embodiments, with reference to FIGS. 1 and 2. Suitable sealing rings 156 and 158 render the assembly leak-proof.

The inlet port is formed with a coupling by means of internal threading 162 and the outlet port 134 is formed with a coupling by means of external threading 164. The metallic tube segment 138 is of increased durability as compared with plastic components.

Figure 8A:
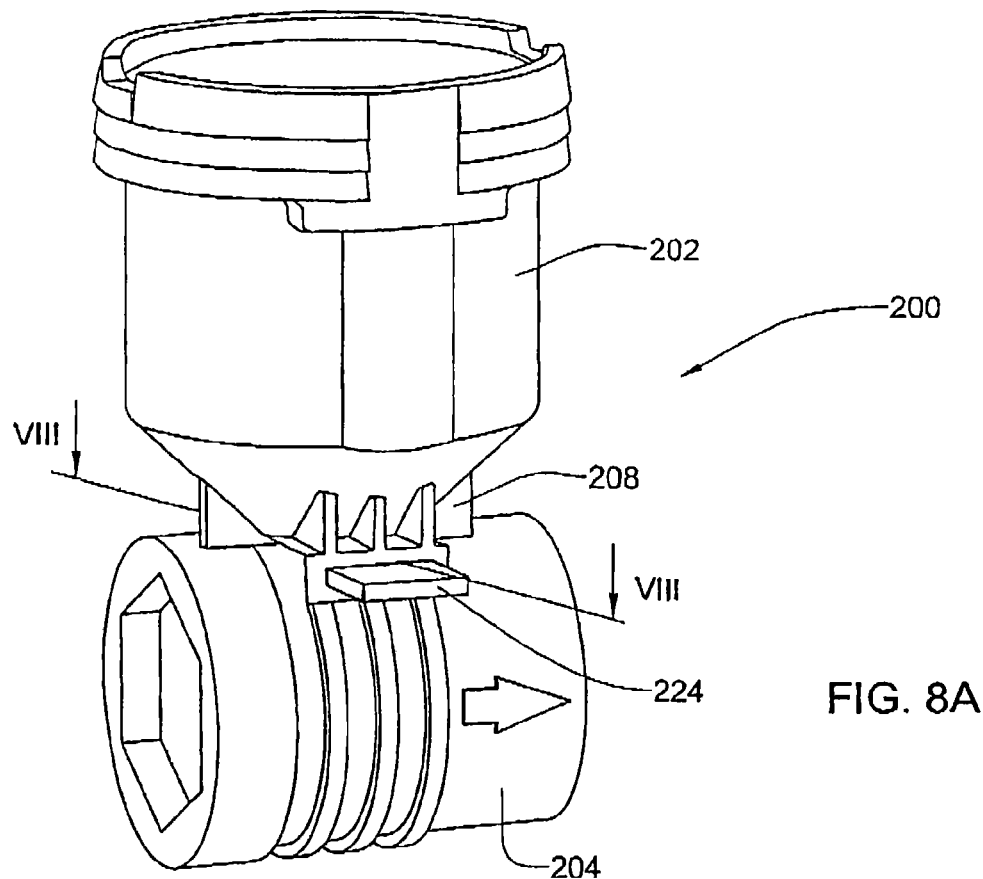
FIG. 8A is an isometric view of a housing of the valve in accordance with an embodiment of the present invention, fitted with a user-interruptible flow path.
Figure 8B:
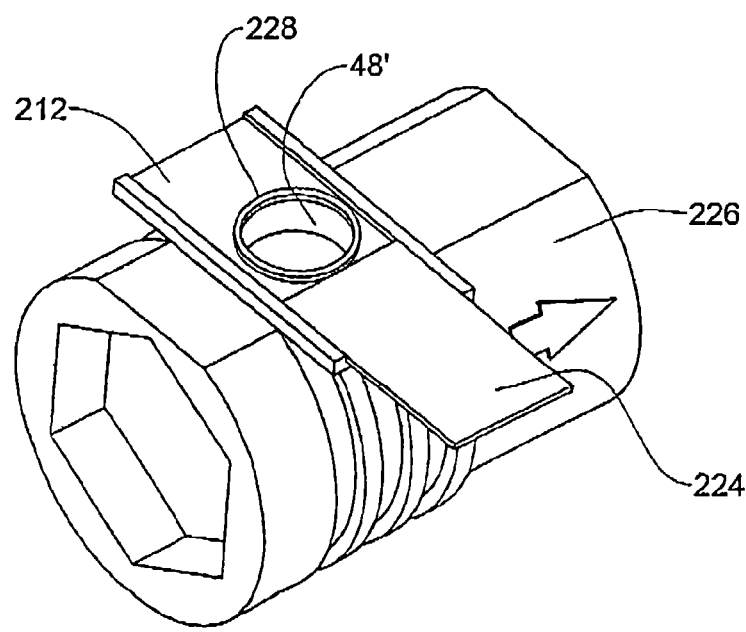
FIG. 8B is a section along line VIII—VIII in FIG. 8A.
Figure 8C:
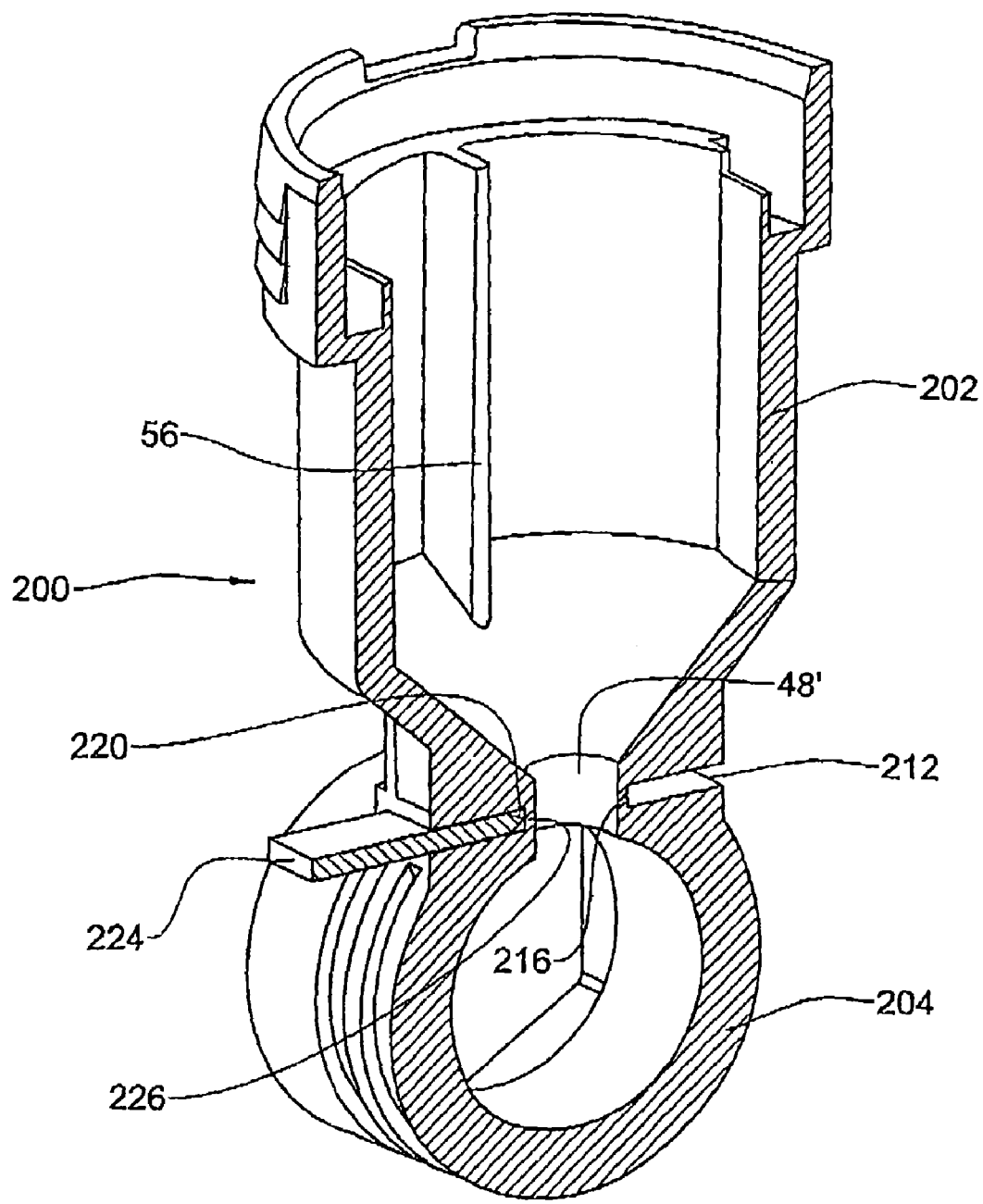
FIG. 8C is a longitudinal view of the housing of the valve of FIG.8A.

Further attention is now directed to FIGS. 8A–8C illustrating a valve casing generally designated 200 and integrally comprising a valve housing 202 and a liquid coupling member 204. The valve 200 may be of the type disclosed in connection with FIGS. 1 and 2 or of the type disclosed in. FIGS. 7A and 7B, namely fitted with a metallic coupling insert. At times, it may be necessary to stop the action of the valve, e.g. in case of malfunction thereof upon entering of dirt into the region of the valve seatings etc. It may also be required to inactivate the valve 200 in case the inlet prohibiting valve member 82 fails to operate when gas enters the piping system or in case the valve 200 becomes immersed in mud (e.g. in the case of a flood or some other environmental disaster) where dirt may then enter the public water supply system.

Accordingly, the casing 200 is fitted at the neck portion 208 with a slot 212 extending at two sides of the inlet duct 48' such that a thin wall portion 216 remains. Preferably, the wall 216 is formed with a V-like notch 220 serving for concentrating mechanical stress, as will be apparent hereinafter. A chisel-like tool 224 is snugly received within the groove 212 at a fit tolerance, so that it does not spontaneously displaced from or within the groove 212. A front tip 226 of the chisel tool 224 is pointed, such that in the assembled position (FIG. 8C) the pointed tip 226 faces the notch 220 of wall 216.

The arrangement is such that when it becomes necessary to inactivate the flow through the valve 200, the tool 224 is forcefully pushed, e.g. by the aid of a hammer, etc. against the wall 216, breaking the wall and extending through the inlet duct 48' to discontinue flow through the inlet duct. It is appreciated that the tight tolerance within the groove 212 ensures a leak-proof and sealing engagement of the flat surfaces of the chisel tool 224 with a peripheral rim 228 (FIG. 813) of the inlet duct 48'. Typically, the user interruptible process is irreversible, namely, it is not possible to mend the broken wall portion 216 and it is required to replace the entire valve 200.

Figure 9A:
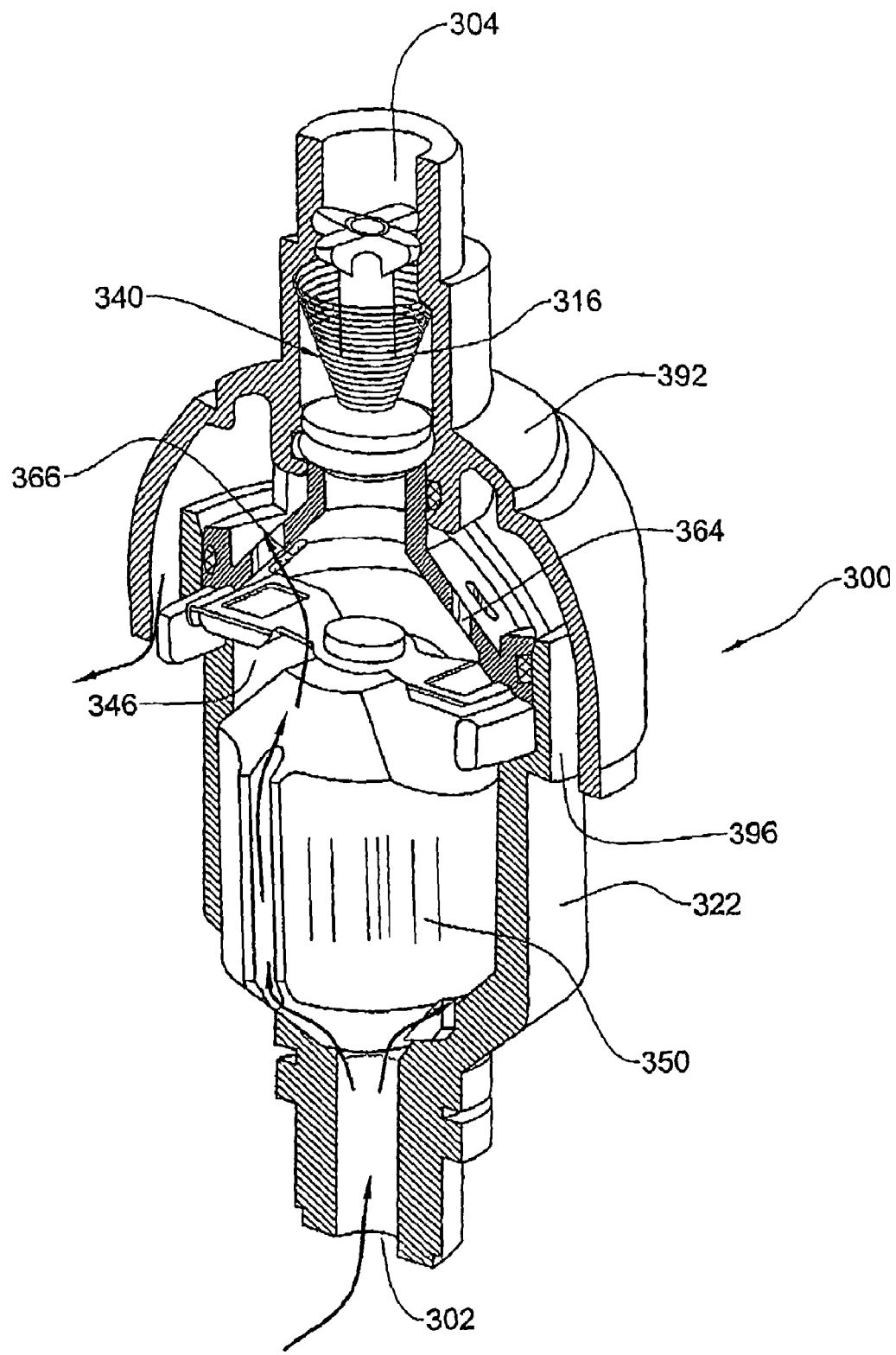
FIG. 9A is a sectioned isometric view of a valve in accordance with a second embodiment of the present invention, the valve in its gas-releasing position.
Figure 9B:
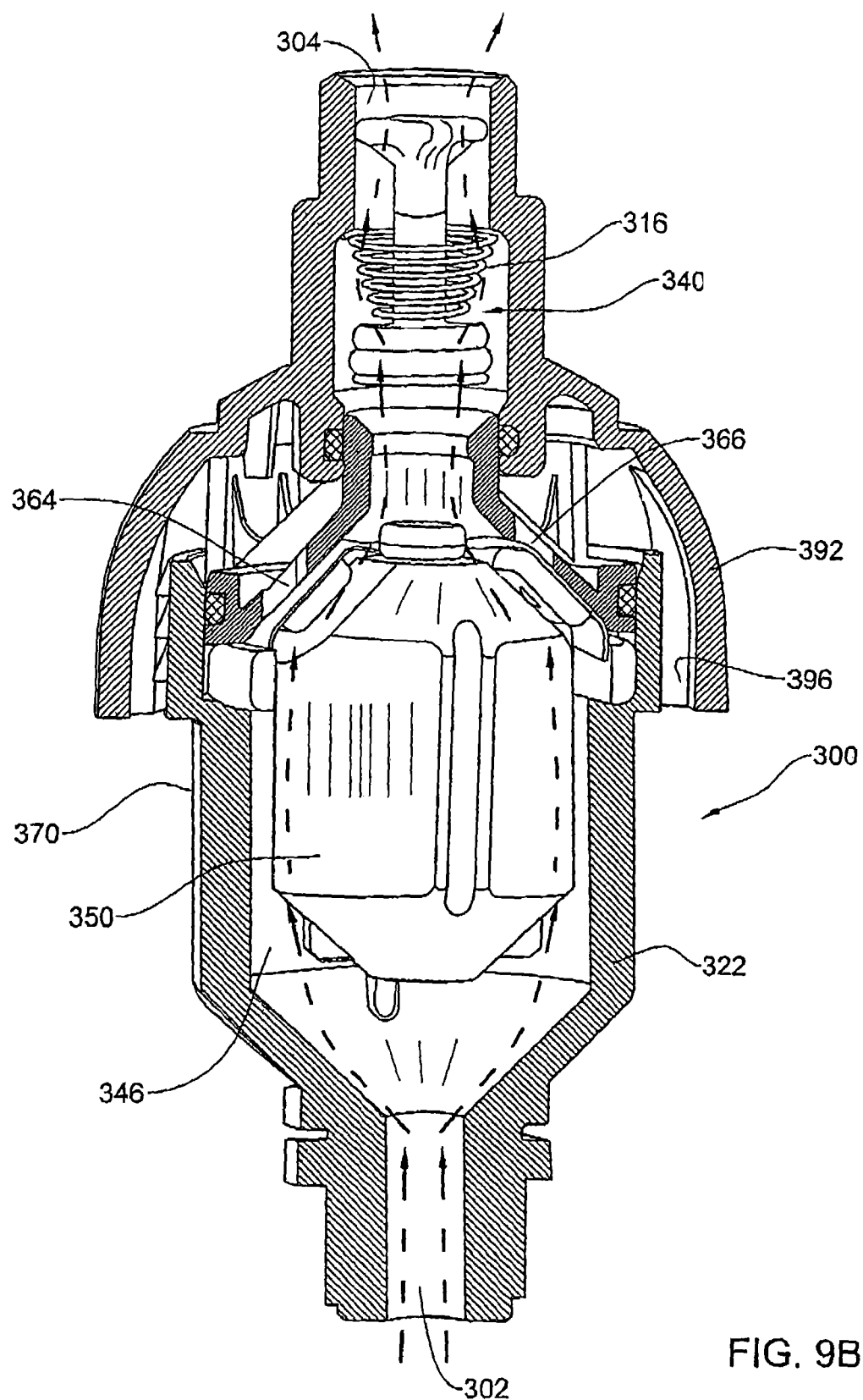
FIG. 9B illustrates the valve of FIG. 9A in its closed position, where liquid flows through the valve.

Further attention is now directed to FIGS. 9A and 9B of the drawings illustrating a different embodiment of the invention suitable for vertical installation such that liquid flow through the housing is enabled whilst functioning as a gas purge valve.

For the sake of clarity, those components which are of similar design and function as in the previous embodiment of FIGS. 1 and 2 are given same reference numbers shifted by 300.

The principle components and function of the valve 300 are principally similar to those disclosed in FIGS. 1 and 2 with the main difference that liquid ingresses the valve through inlet port 302 and egresses through outlet port 304 such that the flow path extends within the housing, between the inlet port 302 and the outlet port 304. In accordance with this particular design, the inlet port 302 and the outlet port 304 are coaxial with the flow path extending through the float receiving space 346. Furthermore, in the present embodiment a gas flow barrier 340, is similar to gas flow barrier 40 disclosed in FIGS. 1 and 2, though it is fitted at the outlet 304 which constitutes an integral part of the top cover 392.

The valve 300 is useful in particular, but not necessarily restricted thereto, for mounting on a vertical piping segment, upstream a flow metering device. The valve 300 will allow liquid flow between the inlet and outlet ports 302 and 304 and will discharge gas entering through the inlet port 302 via the interstice 396, even significantly small amounts of trapped gas (bubbles) at essentially low flow rate and at low pressure (0.3 atmospheres or less).

The valve 300 operates in a similar manner as the valve 20 of the previous embodiment, disclosed with reference to FIGS. 1 to 6. In the case of gas entering the float receiving space 346, the float member 350 remains at its lowermost position (FIG. 9A) such that the gas outlets 364 and 366 remain open, allowing the gas to flow out of the housing 322 and to the atmosphere through interstice 396 between the top cap 392 and the housing 322. The flow path of gas discharged through the valve 300 is illustrated in FIG. 9A by solid arrows.

It is appreciated that the gas flow barrier 340 is of similar design as that illustrated in FIGS. 1 and 2, and in the position of FIG. 9A is closed by the biasing effect of a coiled spring 316, thus preventing gas flow through the outlet port 304.

In the event of liquid entering through inlet port 302, the float member 350 ascends to its upper position as in FIG. 9B, entailing corresponding displacement of the sealing member 370 into sealing engagement thereof with the gas outlets 364 and 366. However, the liquid pressure displaces the gas flow barrier 340 into its open position (FIG. 9) against the biasing effect of coiled spring 316 to thereby allow liquid flow through the outlet port 304. Liquid flow path through the valve 300 is illustrated in FIG. 9B by dashed arrows.

It is to be appreciated that the valve disclosed in FIGS. 9A and 9B has the same characteristics as of the valve disclosed in, FIGS. 1 and 2 as far as sealing and un-sealing (detaching from the valve seatings). Namely, the valve is a combined valve, having the properties of a kinetic valve and of an automatic valve, rendering it suitable for discharging gas flowing at low flow rates and low pressure, as well as at high flow rates.

It is appreciated that the housing 322 may be formed at a lower end thereof, intermediate the inlet port 302 and the float receiving space 346 with an inactivating arrangement similar to that disclosed in connection with FIGS. 8A–8C.

To ensure correct mounting of a valve according to the invention, it is desired that the housing be formed with some indication indicating the flow direction, e.g. arrow 199 in FIG. 7A.

It is also to be noted that while the embodiments disclosed hereinabove illustrate a symmetric arrangement comprising a pair of gas outlets and a corresponding arrangement of the sealing member, it is also possible to design the valve in accordance with an embodiment of the invention (not shown), with a non-symmetric arrangement, i.e. comprising a single array of gas outlets and a sealing member formed with one resilient sealing portion and one rigid (non-pliable)

sealing portion, however, retaining the combined function of the valve (integrated kinetic and automatic).

The pipe segment may be fitted with a one-way outlet valve, in replacement of the inlet prohibiting valve member 82 disclosed in the previous embodiments.

Figure 10A:
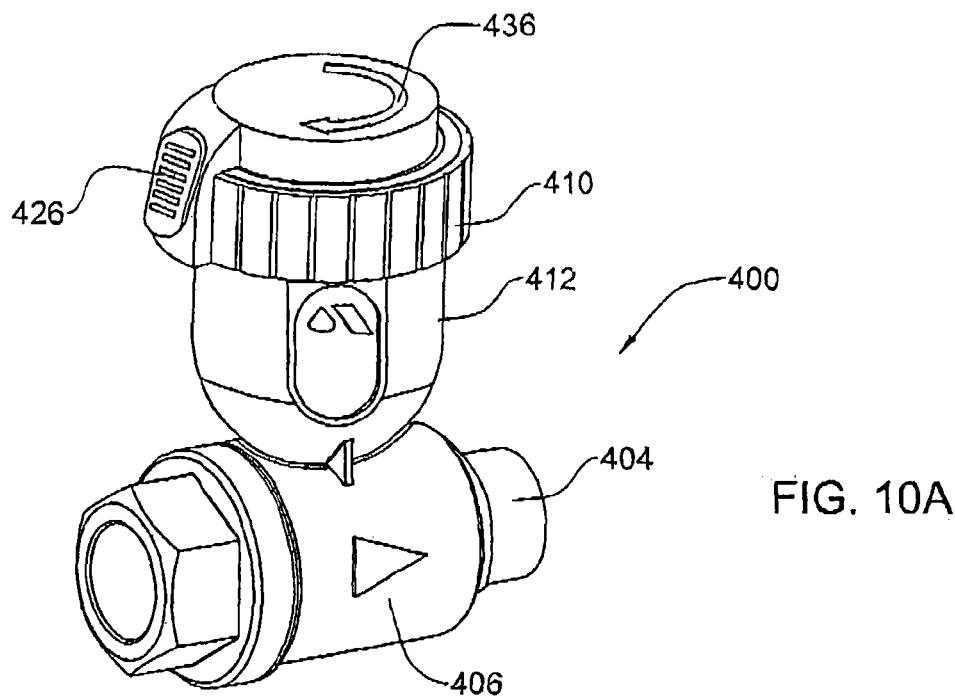
FIG. 10A is an isometric view of a valve in accordance with a modification of the invention designed as a through-flow type valve fitted with a user-interruptible inactivating mechanism.
Figure 10B:
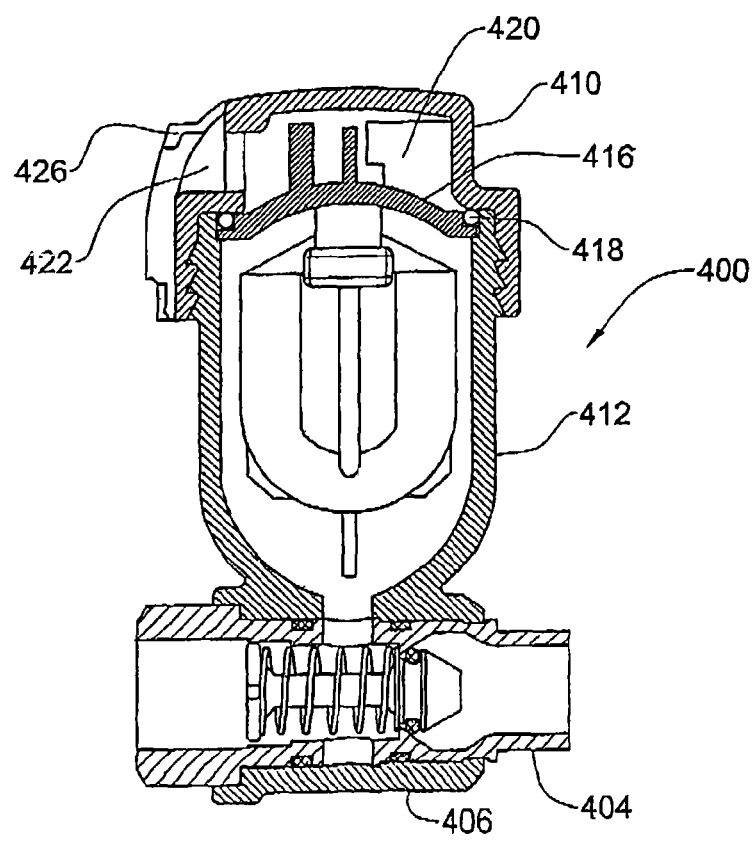
FIG. 10B is a longitudinal section of FIG. 10A.
Figure 11A:
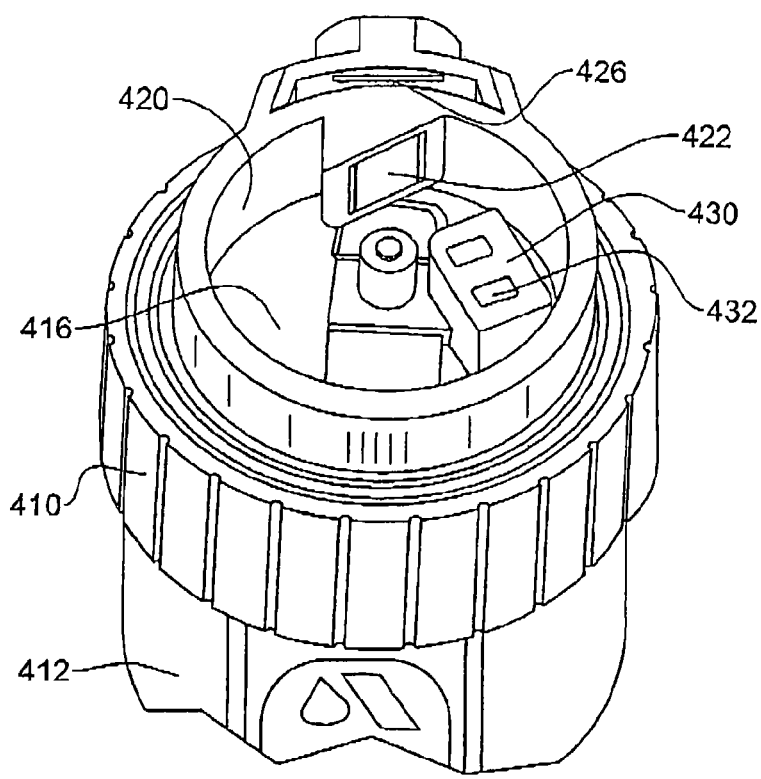
FIG. 11A is an isometric top view of a valve in accordance with the embodiment of FIG. 10B, in an activated position.
Figure 11B:
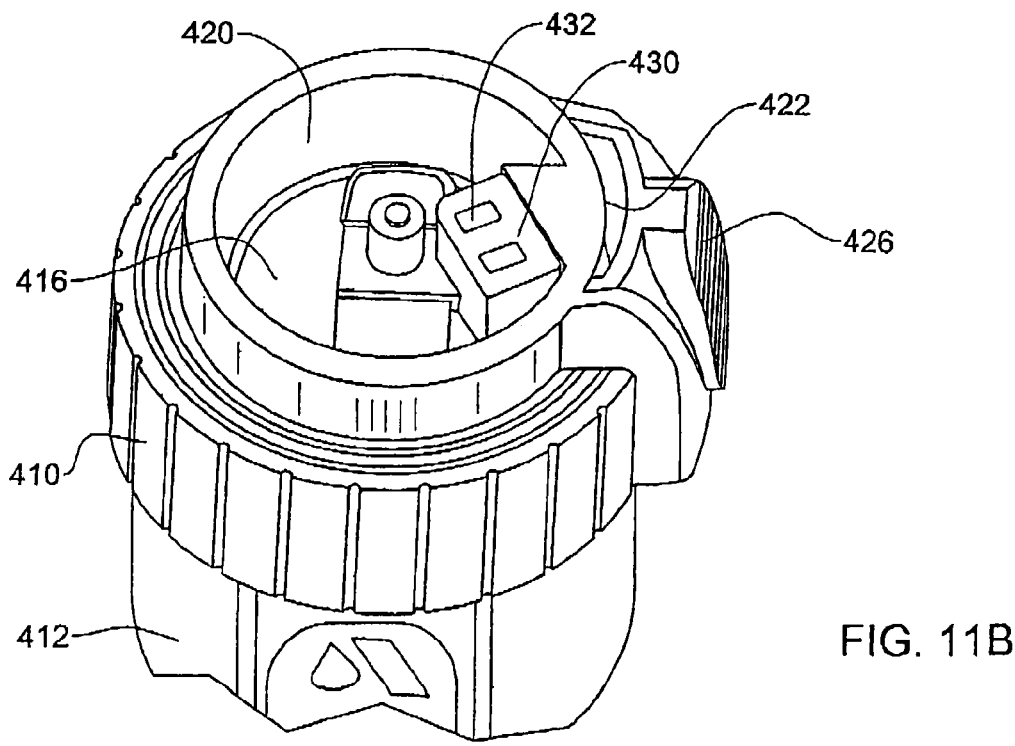
FIG. 11B is an isometric top view of a valve in accordance with the embodiment of FIG. 10B, in an inactivated position.
Figure 12:
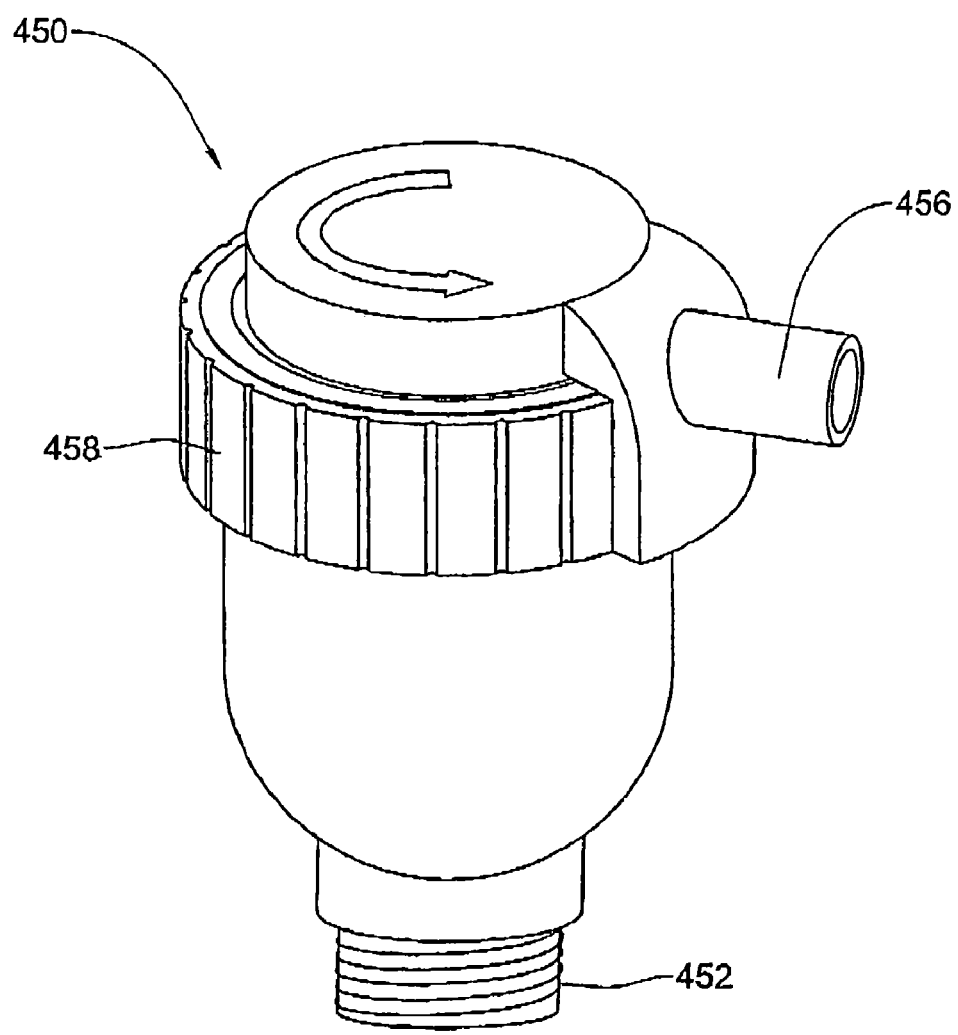
FIG. 12 is an isometric view of a valve in accordance with a modification of the invention designed as an appendix type valve fitted with a user-interruptible inactivating mechanism.

Further attention is now directed to FIGS. 10 to 12 illustrating some modifications of the valve in accordance with the present invention. Turning first to FIGS. 10A and 10B there is illustrated a through-flow type valve generally designated 400 which operates in a similar manner as the valve in accordance with the embodiments of FIGS. 1 to 7 though with some modifications. For example, in the embodiment of FIGS. 10A and 10B there is provided a metallic insert tube segment designated 404 which is snap-fitted within the liquid coupling member 406, thus obviating fastening nut 142 as in. FIGS. 7A and 7B.

Furthermore, the gas discharge flow path is different and is now governed by a top cap 410 snap-fitted over the housing 412 though being rotatable thereabout. The top cap 410 clampingly arrests a gas outlet member 416 with a sealing O-ring 418 provided therebetween.

An outlet chamber 420 is formed between the top cap 410 and the gas outlet member 416, said chamber 420 has a discharge opening 422 fitted with a screen 426 (best seen in FIG. 10A).

As can further be seen (FIGS. 10B, 11A and 11D) gas outlet member 416 is fitted with a resilient sealing member 430 mounted on a pair of stems 432 and sized for sealing engagement with the discharge opening 422 to thereby seal the outlet chamber 420.

The valve 400 operates similarly as the valve disclosed hereinabove in connection with FIGS. 1 to 7, however, inactivation of the valve is now controlled by rotation of the top cap 410 between an operative, open position (FIG. 11A) and a closed, inactivated position. (FIG. 11B) where the sealing member 430 sealingly engages the discharge opening 422 formed in the top cap 410. This arrangement is reversible such that the valve may be activated and deactivated as may be required. It is further desired that the top cap 410 be provided with suitable indicia, e.g. arrows 436 (FIG. 10A) and suitable wording if desired.

It is further appreciated that more than one discharge opening may be provided and accordingly a corresponding arrangement of sealing members is required first to sealingly engage the discharge openings.

FIG. 12 shows another modification of the valve illustrated by a valve 450 fitted with a threading 452 for screw coupling to a liquid coupling member (not shown) and further fitted with a discharge nozzle 456 which in the case of an appendix-type valve may be coupled downstream. However, the inactivating mechanism in the embodiment of FIG. 12 is similar to the embodiment disclosed in connection with the embodiment disclosed in connection with FIGS. 10 and 11, i.e. by rotation of the top cap 410.

What is claimed is:

1. A gas purge valve comprising a housing fitted with an inlet port being in flow communication with a liquid outlet port, and a gas outlet member formed with at least one gas outlet at least one gas outlet member; a gas flow barrier associated with the liquid outlet port; a float member displaceable within the housing between a first position adjacent the inlet port and a second position adjacent the gas outlet; said at least one gas outlet fitted with an inlet prohibiting valve, and being sealingly engageable by a flexible sealing member articulated to the float member, whereby buoyant displacement of the float member into the second position entails sealing of the at least one gas outlet by the flexible sealing member.

2. A gas purge valve according to claim 1, wherein the gas flow barrier is a normally closed one-way valve, which responsive to a pressure exceeding a predetermined magnitude admits liquid flow in direction from the inlet port towards the liquid outlet port.

3. A gas purge valve according to claim 2, wherein the one way valve is spring biased into its closed position.

4. A gas purge valve according to claim 1, wherein the inlet port and the liquid outlet port are integrally formed with the housing.

5. A gas purge valve according to claim 2, wherein the predetermined magnitude pressure for displacing the one way valve into its open position is in the range of about 0.1–0.3 atmospheres.

6. A gas purge valve according to claim 1, wherein the housing is fitted with a top cap whereby the gas outlet is tamper-proof.

7. A gas purge valve according to claim 1, wherein a liquid flow path extends between the inlet port and the outlet port.

8. A gas purge valve according to claim 7, wherein the housing is made of plastic material, and where the flow path extends through a uniform metallic coupling member.

9. A gas purge valve according to claim 8, wherein the metallic coupling member is formed with an aperture extending in register with a corresponding inlet duct formed in the housing.

10. A gas purge valve according to claim 1, wherein the housing is formed with a user-interruptible arrangement for inactivating the valve.

11. A gas purge valve according to claim 10, wherein the housing is formed with an inlet duct extending intermediate the inlet port and a float receiving space of the housing; where flow through said inlet duct is user-interruptible to thereby inactivate the valve.

12. A gas purge valve according to claim 11, wherein inactivating the valve does not interrupt fluid flow between the inlet port and the outlet port.

13. A gas purge valve according to claim 11, wherein the inlet duct is formed with a wall breakable by a tool serving also for blocking flow through said inlet duct.

14. A gas purge valve according to claim 13, wherein the wall of the inlet duct is formed with a stress concentration notch, and where the tool is a chisel-like article formed with a front end for breaking the wall at said notch and said tool has a flat surface portion for sealing engagement of the inlet duct.

15. A gas purge valve according to claim 11, wherein the user-interruptible process is irreversible.

16. A gas purge valve according to claim 10, wherein the gas outlet opens into an outlet chamber formed under a sealing top cap formed with one or more discharge openings; corresponding one or more sealing members are provided within the outlet chamber where the valve can be inactivated by aligning the one or more discharge openings with the one or more sealing members so as to seal the discharge openings.

17. A gas purge valve according to claim 16 wherein the top cap is sealingly rotatable over the housing between an open, activated position and a closed, inactivated position and the one or more discharge openings are sealingly engaged by the corresponding one or more sealing members.

18. A gas purge valve according to claim 16, wherein the discharge opening formed in the top cap is fitted with an outlet grid.

19. A gas purge valve according to claim 16, wherein the discharge opening formed in the top cap is fitted with an outlet tube section.

20. A gas purge valve according to claim 16, wherein the top cap is snappingly secured over the housing and is sealingly rotatable thereabout.

21. A gas purge valve according to claim 16, wherein the top cap secures the gas outlet member.

22. A gas purge valve according to claim 1, wherein the housing comprises at least a pair of gas outlet ports, each bounded by a sealing seat sealingly engageable by a corresponding sealing portion of the sealing member.

23. A gas purge valve according to claim 22, wherein at least one of the gas outlet ports comprises a first outlet aperture and a second outlet aperture bounded by first and second valve seatings, respectively; and where displacement of the float member from the second position to the first position, progressively detaches the sealing member initially from the first valve seating so as to open initially said first outlet aperture and subsequently from said second valve seating so as to open subsequently said second outlet aperture, whilst buoyant displacement of said float member from said first position to said second position allows for said float member to become sealingly biased against said seatings.

24. A gas purge valve according to claim 23, wherein the first outlet aperture is a continuation portion of the second outlet aperture.

25. A gas purge valve according to claim 23, wherein a first portion of the sealing member adapted to bear against the first valve seating is of lesser rigidity than a second portion adapted to bear against the second valve seating.

26. A gas purge valve according to claim 25, wherein the second portion of the sealing member comprises a cushioned sealing portion engageable by a corresponding biasing portion of the float member biasing it into sealing engagement with the outlet valve seatings.

27. A gas purge valve according to claim 26, wherein the cushioned sealing portion of the sealing member and the biasing portion of the float member are equally inclined with respect to an axis of displacement of the float member.

28. A gas purge valve according to claim 26, wherein the cushioned sealing portion of the sealing member is formed with a bulge engageable by the corresponding biasing portion of the float member, to thereby give rise to reactionary forces acting along a line normal to a sealing surface of the first portion of the sealing member.

29. A gas purge valve according to claim 1, wherein the sealing member is articulated to a top portion the float member, whereby buoyant displacement of the float member into its second position applies a combined pull/push force on the sealing member into sealing of the gas outlet.

30. A gas purge valve according to claim 23, wherein one of the first portion of the sealing member and the corresponding second valve seating is indented with respect to the other one of said first portion of the sealing member and the corresponding second valve seating, to thereby increase the effective sealing area.

31. A gas purge valve according to claim 23, wherein the inlet prohibiting valve is a leaf-type valve bearing against an external sealing surface of the first outlet aperture and a second outlet aperture of the gas outlet port.

32. A gas purge valve according to claim 1, wherein the housing is fitted at a top portion thereof with a seating member formed with the at least one gas outlet opening.

33. A gas purge valve according to claim 32, wherein the seating member is sealingly attached at a top portion of the housing.

34. A gas purge valve according to claim 33, wherein the seating member clampingly arrests respective ends of the sealing member to the housing.

35. A gas purge valve according to claim 32, wherein the seating member is formed at an inner side thereof with at least one gas outlet seating, and at an outside surface thereof with at least one inlet prohibiting valve seating.

36. A gas purge valve according to claim 35, wherein the inlet prohibiting valve is a leaf-type valve bearing against an external seating surface of the seating member, corresponding with the at least one gas outlet seating.

37. A gas purge valve according to claim 1, wherein the sealing member is formed with at least one first portion adapted to bear against a corresponding at least one first valve seating of the gas outlet, and at least one second portion of greater rigidity adapted to bear against a corresponding at least one second valve seating of the gas outlet.

38. A gas purge valve according to claim 37, wherein the sealing member is a strip-like member formed with an opening for engagement with a corresponding projection of the float member, at least one first sealing portion adjoining said opening, and at least one second sealing portion.

39. A gas purge valve according to claim 38, wherein the sealing member comprises two first sealing portions adjoining the opening, and two second sealing portions adjacent respective lateral edges of the sealing member.

40. A gas purge valve according to claim 39, wherein the lateral edges of the strip-like sealing member are clampingly secured to the housing.

41. A gas purge valve according to claim 1, wherein a liquid flow path extends essentially vertically between the inlet port and the outlet port.

42. A gas purge valve according to claim 1, wherein the liquid flow path extends through the housing.

43. A gas purge valve according to claim 32, wherein the inlet port, the outlet port and the housing coaxially extend along a vertical axis of the housing.

44. A gas purge valve according to claim 32, wherein the outlet port is fitted at a top cap of the housing and where the gas outlet is tamper-proof.

45. A gas purge valve according to claim 35, wherein the outlet port accommodates the gas flow barrier in the form of a normally closed one-way valve, which responsive to a pressure exceeding a predetermined magnitude admits liquid flow in a direction from the inlet port towards the outlet.

46. A gas purge valve according to claim 33, being a liquid through-flow type valve rather than an appendix-type valve.

47. A gas purge valve according to claim 33, wherein the gas outlet member is formed with a liquid outlet being in flow communication with the outlet port of the valve.

48. A gas purge valve according to claim 41, wherein the housing comprises at least a pair of gas outlet ports, each bounded by a sealing seat sealingly engageable by a corresponding sealing portion of the sealing member.

49. A gas purge valve according to claim 48, wherein at least one of the gas outlet ports comprises a first outlet aperture and a second outlet aperture bounded by first and second valve seatings, respectively; and where displacement of the float member from the second position to the first position, progressively detaches the sealing member initially from the first valve seating so as to open initially said first outlet aperture and subsequently from said second valve seating so as to open subsequently said second outlet aperture, whilst buoyant displacement of said float member from said first position to said second position allows for said float member to become sealingly biased against said seatings.

50. A gas purge valve according to claim 41, wherein the housing is formed with an inlet duct extending intermediate the inlet port and a float receiving space of the housing, whereby flow through said inlet duct is user-interruptible to thereby inactivate the valve and permanently stop liquid flow between the inlet port and the outlet port.

51. A gas purge valve according to claim 23, wherein the float member and the housing are fitted with mating axial restricting members for limiting displacement of float member within the housing in an axial direction only.

* * * * *

UNITED STATES PATENT AND TRADEMARK OFFICE
CERTIFICATE OF CORRECTION

PATENT NO. : 7,013,907 B2  Page 1 of 1
APPLICATION NO. : 10/609127
DATED : March 21, 2006
INVENTOR(S) : Ryabtsev et al.

It is certified that error appears in the above-identified patent and that said Letters Patent is hereby corrected as shown below:

Claim 1, Column 11, Lines 59-60,
Please delete "with at least one gas outlet at least one gas outlet member; "
and replace with -- with at least one gas outlet; --

Signed and Sealed this

Seventh Day of August, 2007

JON W. DUDAS
*Director of the United States Patent and Trademark Office*